(12) United States Patent
Ng

(10) Patent No.: US 11,061,250 B2
(45) Date of Patent: Jul. 13, 2021

(54) LENS REPLACEABLE EYEGLASSES

(71) Applicant: Choon Kheang Ng, Tainan (TW)

(72) Inventor: Choon Kheang Ng, Tainan (TW)

(73) Assignee: TEAMWORKS GLASSES CORP, Tainan (TW)

( * ) Notice: Subject to any disclaimer, the term of this patent is extended or adjusted under 35 U.S.C. 154(b) by 246 days.

(21) Appl. No.: 16/447,951

(22) Filed: Jun. 20, 2019

(65) Prior Publication Data

US 2020/0400971 A1    Dec. 24, 2020

(51) Int. Cl.
*G02C 1/08* (2006.01)
*G02C 5/14* (2006.01)
*G02C 3/00* (2006.01)
*G02C 1/06* (2006.01)

(52) U.S. Cl.
CPC ............. *G02C 5/146* (2013.01); *G02C 1/06* (2013.01); *G02C 3/006* (2013.01)

(58) Field of Classification Search
CPC ............ G02C 1/08; G02C 3/006; A61F 9/027
USPC ................ 351/156, 157, 90, 93, 96, 99, 100
See application file for complete search history.

(56) References Cited

U.S. PATENT DOCUMENTS

2013/0114038 A1*  5/2013  Huang .................... G02C 5/10
                                                                 351/116

* cited by examiner

*Primary Examiner* — Hung X Dang

(57) ABSTRACT

A pair of eyeglasses includes a front with two lenses installed in the two openings thereof. Two lugs respectively extend from two ends of the front and each have a slot communicating with the opening corresponding thereto. Two threaded holes are respectively defined through the two ends of the front and communicate with the two slots. Two screws threadedly extend through the two threaded holes to narrow the slots to secure the two lenses in the front. The two lugs are clamped between the two connectors and two securing members by bolts extending through the securing members, the lugs and the two connectors, and connected with two positioning members. The lenses can be replaced by unscrewing the bolts and the screws.

6 Claims, 7 Drawing Sheets

LENS REPLACEABLE EYEGLASSES

BACKGROUND OF THE INVENTION

1. Fields of the Invention

The present invention relates to a pair of eyeglasses, and more particularly, to a pair of lens replaceable eyeglasses.

2. Descriptions of Related Art

There are multiple types of eyeglasses such as reading glasses, sunglasses, and safety glasses so that the users can choose one of these types of eyeglasses according to practical needs. Generally, the eyeglasses include a front and two temples, two lenses are installed to the front, and the two temples allow the eyeglasses to be well supported onto the two years of the users. The two temples can also be replaced with a band when the eyeglasses are used in sport. Once either one of the two lenses is broken, the users usually have to send the eyeglasses to a specialist to replace the lens.

The present invention intends to provide a pair of lens replaceable eyeglasses and the lenses are easily replaced by the users.

SUMMARY OF THE INVENTION

The present invention relates to a pair of eyeglasses, and comprises a front having two openings in which two lenses are respectively engaged. Two lugs respectively extend from two ends of the front, and each lug has a slot which communicates with the opening corresponding thereto. Each lug has at least one bore. Two threaded holes are respectively defined through the two ends of the front and communicate with the two slots. Two screws are respectively and threadedly connected to the two threaded holes. Two connectors are respectively connected to the two lugs and each of the two connectors includes a recessed area defined in the outside thereof. Each of the two connectors has a chamber defined in the inside thereof. At least one through hole is defined through the inner bottom of the chamber and located corresponding to the at least one bore of the lug corresponding thereto. The at least one through hole of each connector communicates with the recessed area corresponding thereto. A concaved face is defined in the inside of each connector and communicates with the chamber corresponding thereto.

Two positioning members are respectively connected to the recessed areas, and each positioning member has at least one tubular portion extending from the inside thereof. The at least one tubular portion extends through the at least one through hole and is inserted into the at least one bore of the lug corresponding thereto. Two securing members are respectively connected to the two concaved faces of the two connectors. Each of the two securing members has at least one stepped hole. A bolt extends through the at least one stepped hole of the securing member corresponding thereto and is threadedly connected to the at least one tubular portion of the positioning member corresponding thereto.

Preferably, the chamber is a U-shaped chamber which forms an open end at the connector that is located corresponding to the lug, and a closed end which is formed at an inner end of the chamber. The width of the chamber is reduced from the closed end toward the open end. The width of the closed end is larger than the width of the open end. The width of the closed end is substantially equal to the width of the lug. The width of the open end is substantially equal to the width of the lug when the lens is installed to the frame.

Preferably, a band is connected between the two connectors.

Preferably, the two connectors each are connected to a temple.

Preferably, each of the two securing members is shaped to be the same as a shape of the concaved face corresponding thereto. Each securing member has a protrusion which is formed at the inside thereof and shaped the same as a shape of the chamber corresponding thereto. The protrusion of each securing member is engaged with the chamber corresponding thereto. Each of the two securing members is engaged with the concaved face of the connector corresponding thereto.

Preferably, two decorative members each are connected to the inside of each of the securing members. Each of the two decorative members has at least one passage which is located corresponding to the at least one stepped hole of the securing member. The bolt extends through the at least one passage and the stepped hole and is threadedly connected to the at least one tubular portion of the positioning member corresponding thereto, Each of the two decorative members includes two notches. Each of the two securing members includes two positioning pins which are engaged with the notches to position the decorative member to the securing member corresponding thereto.

The advantages of the present invention are that the users can easily replace the lenses as needed simply by unscrewing the bolts and the screws. The lenses are secured in the openings of the front.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
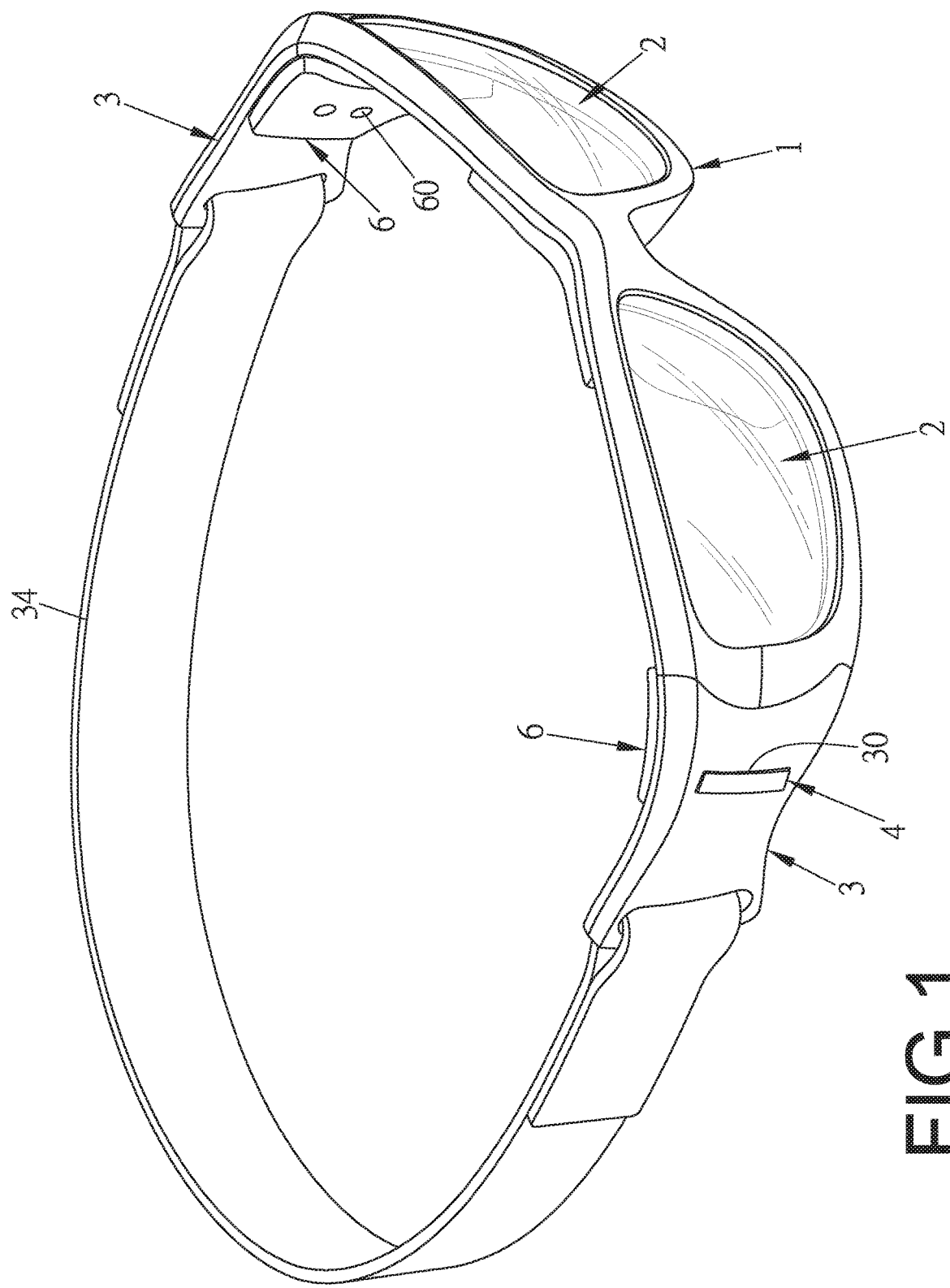
FIG. 1 is a perspective view to show the eyeglasses of the present invention.
Figure 2:
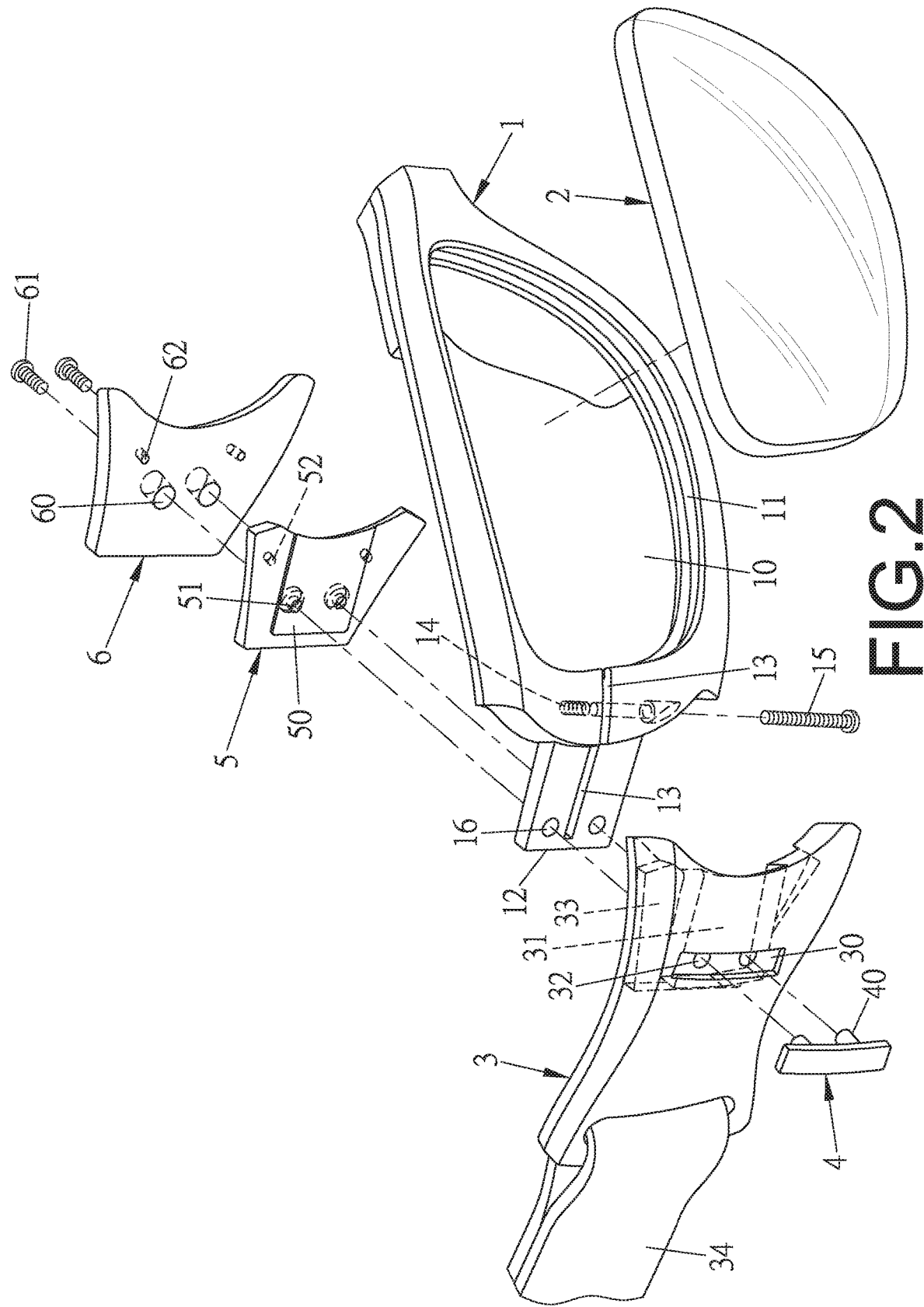
FIG. 2 is an exploded view of the eyeglasses of the present invention.
Figure 3:
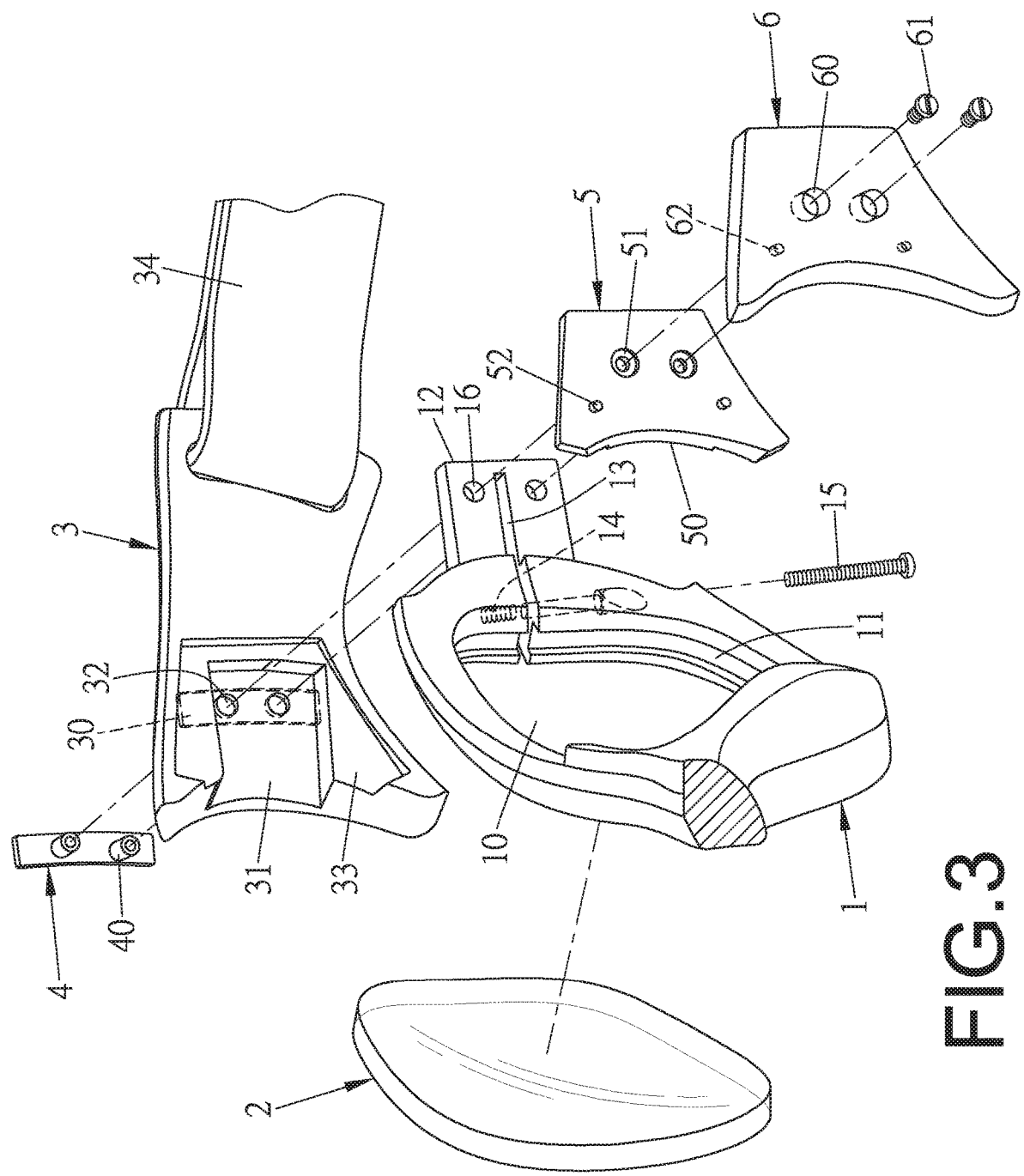
FIG. 3 is another exploded view of the eyeglasses of the present invention.

Referring to FIGS. 1 to 5, the eyeglasses of the present invention comprise a front 1 having two eyewear with a bridge formed between the two eyewear, and each eyewear has an opening 10. A groove 11 is defined in the inner periphery of each opening 10 such that a lens 2 is engaged with the groove 11 and secured within the opening 10. Two lugs 12 respectively extend from two ends of the front 1, and each lug 12 has a slot 13 which communicates with the opening 10 corresponding thereto. Each lug 12 has two bores 16 defined therethrough. Two threaded holes 14 are respectively defined through the two ends of the front 1 and communicate with the two slots 13. Preferably, each of the two threaded holes 14 is formed from the lower end of the frame 1.

Figure 4:
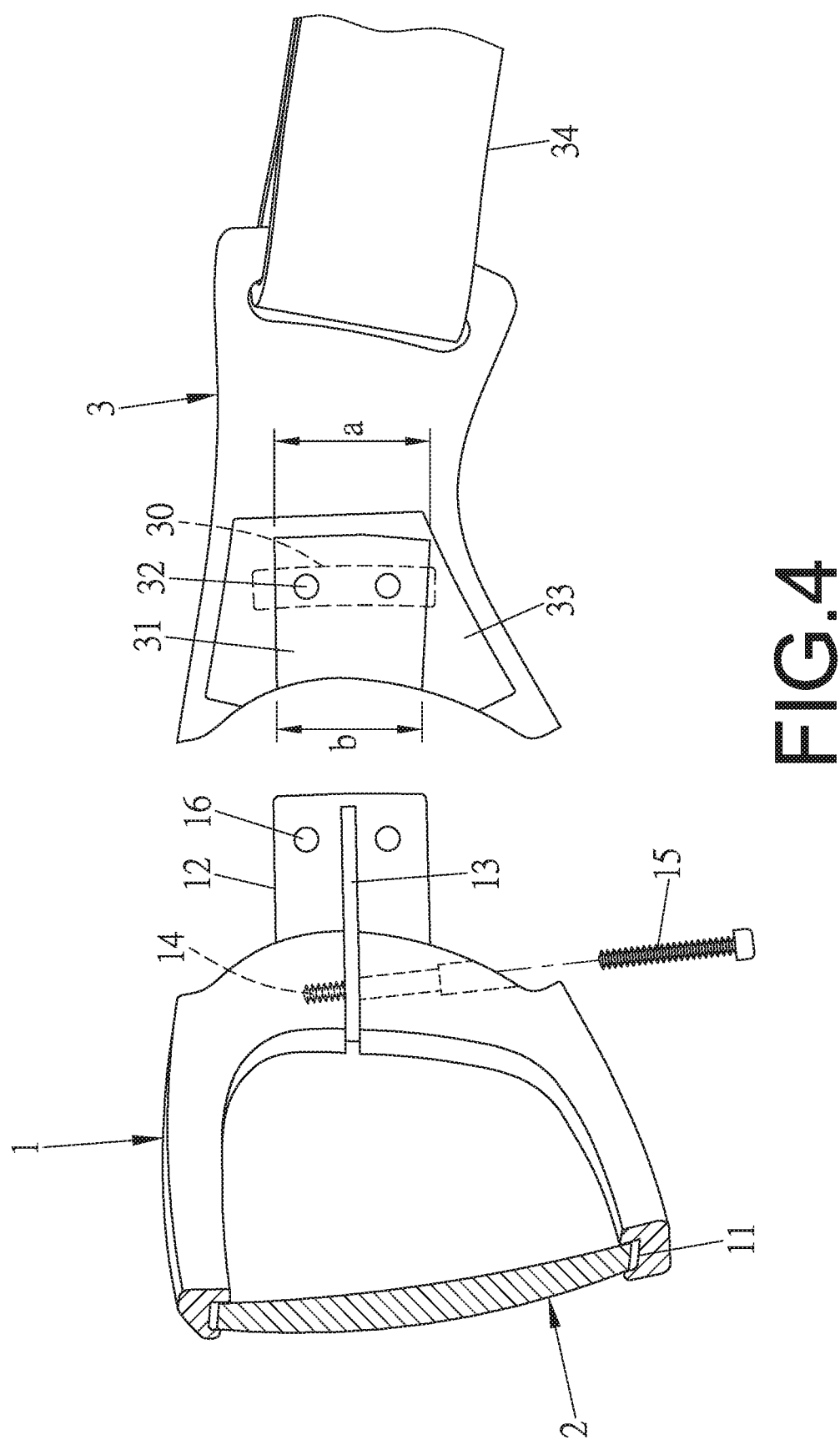
FIG. 4 shows that a lens is engaged with the opening of the front, and the screw is not yet connected to the threaded hole in the front.
Figure 5:
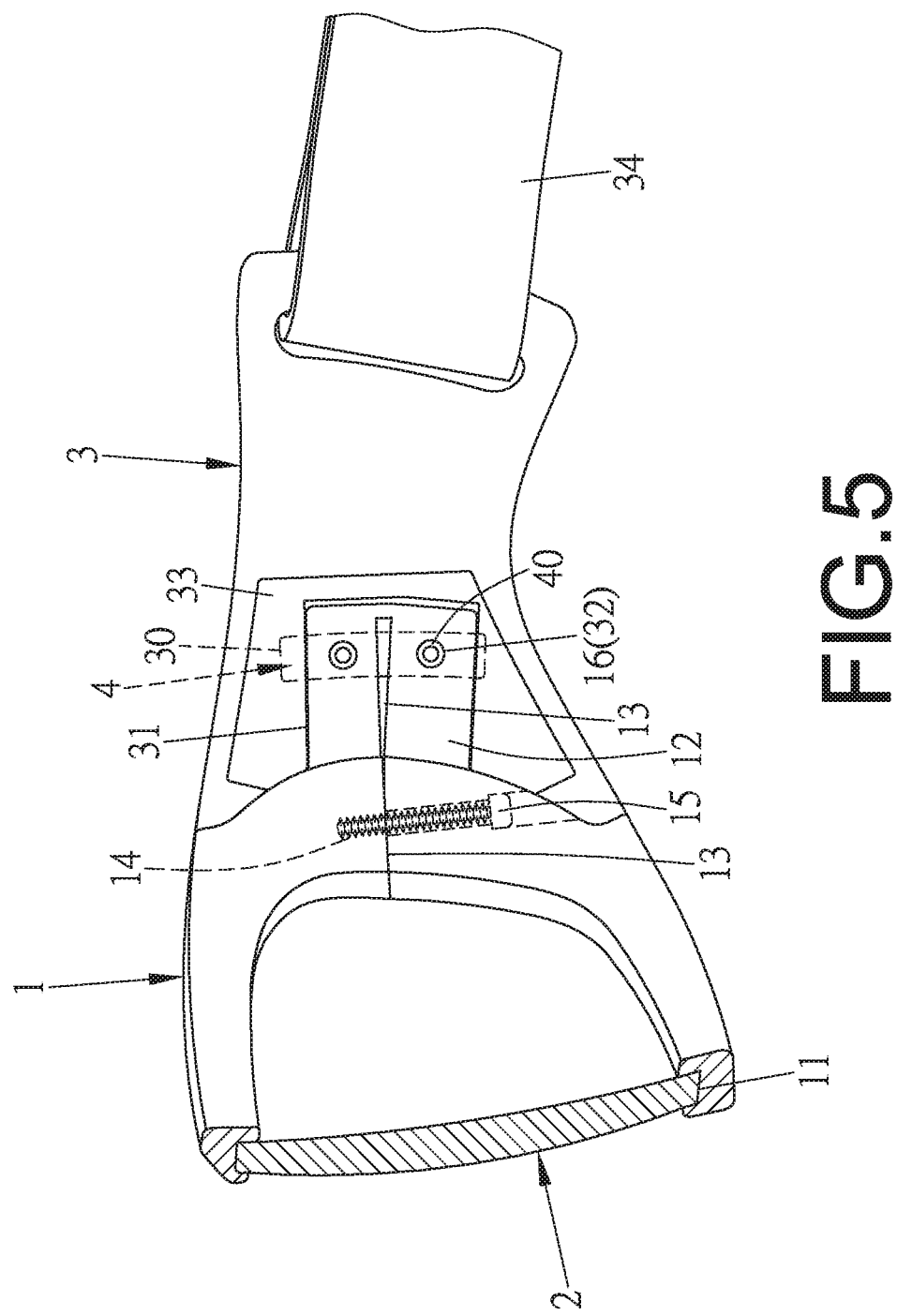
FIG. 5 shows that a lens is securely engaged with the opening of the front by connecting the screw to the threaded hole in the front.
Figure 6:
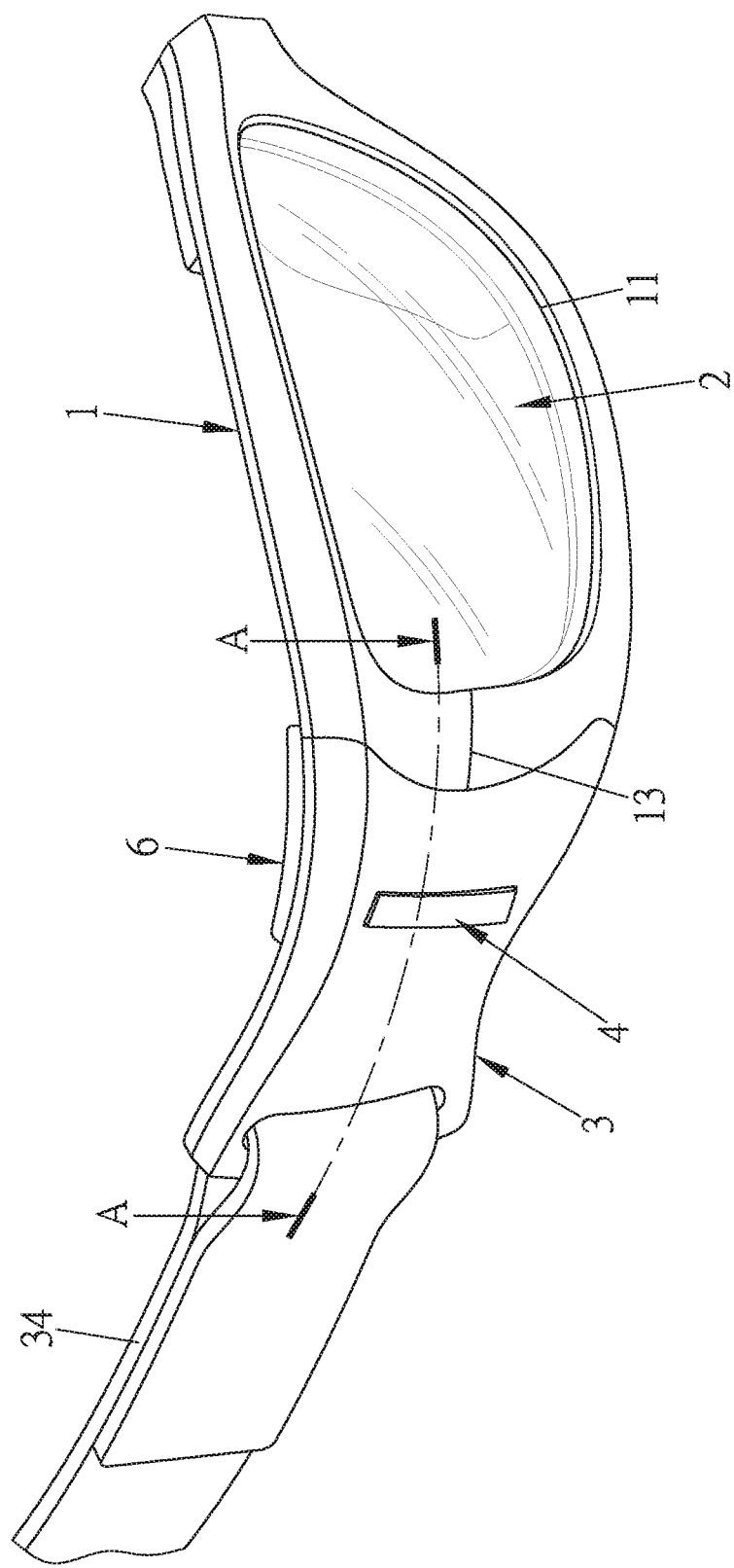
FIG. 6 is a portion of the eyeglass of the present invention.
Figure 7:
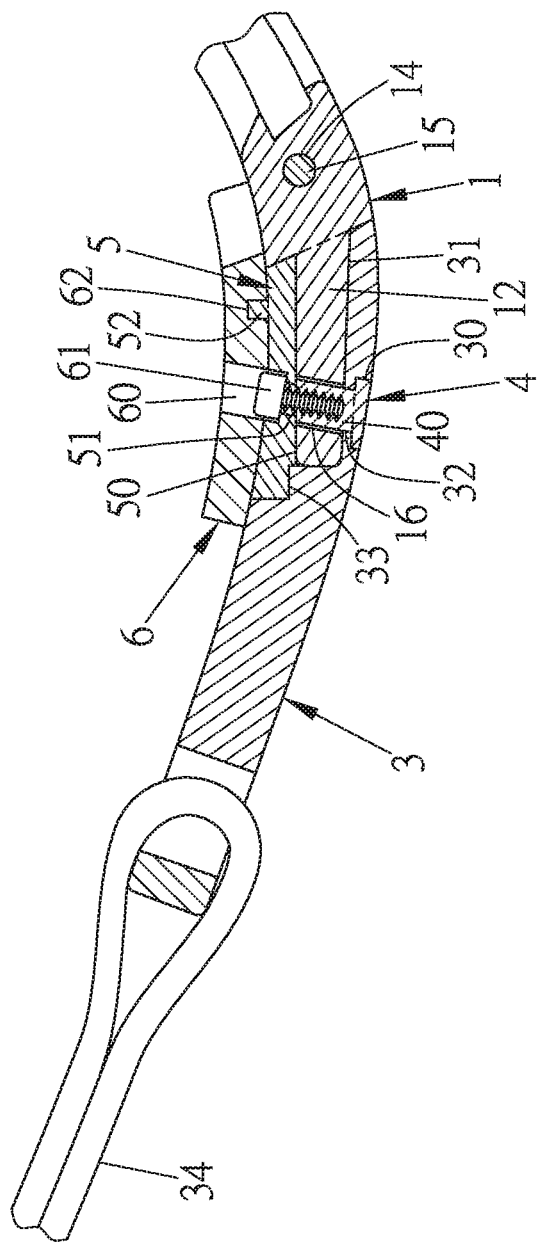
FIG. 7 is a cross sectional view, taken along line A-A in FIG. 6.

Two connectors 3 are respectively connected to the two lugs 12. A band 34 is connected between the two connectors 3. The two lugs 12 may also be connected with two temples (not shown). Each of the two connectors 3 includes a recessed area 30 defined in the outside thereof, and each of the two connectors 3 has a chamber 31 defined in the inside thereof. Two through holes 32 are defined through the inner bottom of the chamber 31 and located corresponding to the two bores 16 of the lug 12 corresponding thereto. The two through holes 32 of each connector 3 communicate with the recessed area 30 corresponding thereto. A concaved face 33 is defined in the inside of each connector 3 and communicates with the chamber 31 corresponding thereto. As shown in FIG. 4, the chamber 31 is a U-shaped chamber which forms an open end at the connector 3 that is located corresponding to the lug 12, and a closed end which is formed at the inner end of the chamber 31. The width of the chamber 31 is gradually reduced from the closed end toward the open end. That is to say, the width "a" of the closed end is larger than the width "b" of the open end. The width "a" of the closed end is substantially equal to a width of the lug 12, and the width "b" of the open end is substantially equal to the width of the lug 12 when the lens 2 is installed to the frame 1 as shown in FIG. 5.

Two positioning members 4 are respectively connected to the recessed areas 30. Each positioning member 4 has two tubular portions 40 extending from the inside thereof and each of the two tubular portions 40 has a threaded recess defined in the distal end thereof. The tubular portions 40 extend through the through holes 32 and are inserted into the bores 16 of the lug 12 corresponding thereto.

Two securing members 5 are respectively connected to the two concaved faces 33 of the two connectors 3. Specifically, each of the lugs 12 is located between the connector 3 and the securing member 5 corresponding thereto. Each of the two securing members 5 is shaped to be the same as the shape of the concaved face 33 corresponding thereto. Each securing member 5 has a protrusion 50 which is formed at the inside thereof and shaped the same as a shape of the chamber 31 corresponding thereto. Each of the two securing members 5 has two stepped holes 51 which extend through the protrusion 50. The protrusion 50 of each securing member 5 is engaged with the chamber 31 corresponding thereto. Each of the two securing members 5 is engaged with the concaved face 33 of the connector 3 corresponding thereto.

Two bolts 61 extend through the stepped holes 51 of the securing member 5 corresponding thereto and are threadedly connected to the threaded recesses of the tubular portions 40 of the positioning member 4 corresponding thereto. In one embodiment, two decorative members 6 each are connected to the inside of each of the securing members 5. Each of the two decorative members 6 has two passages 60 which are located corresponding to the stepped holes 51 of the securing member 5. The bolts 61 extend through the passages 60 and the stepped holes 51, and are threadedly connected to the threaded recesses of the two tubular portions 40 of the positioning member 4 corresponding thereto. Each of the two decorative members 6 includes two notches 62, and each of the two securing members 5 includes two positioning pins 52 which are engaged with the notches 62 to position the decorative member 6 to the securing member 5 corresponding thereto.

As shown in FIGS. 1 to 7, when assembling the eyeglasses, the two lenses 2 are installed in the openings 10 and engaged with the grooves 11 of the two openings 10 as shown in FIG. 4. Two screws 15 are respectively and threadedly connected to the two threaded holes 14 such that the slots 11 are narrowed and the lenses 2 are secured in the openings 10 as shown in FIG. 5. The width of the chamber 31 is gradually reduced from the closed end toward the open end so that the width "b" of the open end is substantially equal to the width of the lug 12 when the lens 2 is installed to the frame 1 as shown in FIG. 5. The lugs 12 are then inserted into the chambers 31, and the positioning members 4 are installed in the recessed areas 30. The tubular portions 40 of each of the positioning members 4 extend through the through holes 32 and the bores 16. The protrusion 50 of each securing member 5 is engaged with the chamber 31 corresponding thereto, and the protrusion 50 compresses the lug 12 corresponding thereto. The decorative members 6 are then connected to the securing members 5. The two positioning pins 52 are engaged with the notches 62 to position the decorative member 6 to the securing member 5 corresponding thereto. The bolts 61 extend through the passages 60 and the stepped holes 51, and are threadedly connected to the threaded recesses of the two tubular portions 40 of the positioning member 4 corresponding thereto to complete the assembly of the eyeglasses.

The lenses 2 are securely installed to the front 1 by securing the lugs 12 in the chambers 31 of the connectors 3. That is to say, even when the screws 15 are loosened, because the lugs 12 are urged by the connectors 3 as shown in FIG. 5, the lenses 2 are stilled well positioned in the openings 10. When replacing the lenses 2, simply unscrewing the bolts 61 to remove the securing members 5, the decorative members 6, the connectors 3 and the positioning members 4 from the front 1. The screws 15 then are unscrewed, the slots 13 return to their original width so that the lenses 2 can be easily removed from the front 1. New lenses 2 are then installed and secured to the front 1.

While we have shown and described the embodiment in accordance with the present invention, it should be clear to those skilled in the art that further embodiments may be made without departing from the scope of the present invention.

What is claimed is:

1. A pair of eyeglasses, comprising:
a front having two eyewear with a bridge formed between the two eyewear, each eyewear having an opening and a groove defined in an inner periphery of each opening, two lugs respectively extending from two ends of the front, each lug having a slot which communicates with the opening corresponding thereto, each lug having at least one bore defined therethrough, two threaded holes respectively defined through the two ends of the front and communicate with the two slots, two screws respectively and threadedly connected to the two threaded holes;
two lenses respectively located in the two openings and engaged with the two grooves;
two connectors respectively connected to the two lugs and each of the two connectors including a recessed area defined in an outside thereof, each of the two connectors having a chamber defined in an inside thereof, at least one through hole defined through an inner bottom of the chamber and located corresponding to the at least one bore of the lug corresponding thereto, the at least one through hole of each connector communicating with the recessed area corresponding thereto, a concaved face defined in the inside of each connector and communicating with the chamber corresponding thereto;

two positioning members respectively connected to the recessed areas, each positioning member having at least one tubular portion extending from an inside thereof and each of the at least one tubular portion having a threaded recess defined in a distal end thereof, the at least one tubular portion extending through the at least one through hole and inserted into the at least one bore of the lug corresponding thereto, and two securing members respectively connected to the two concaved faces of the two connectors, each of the two securing members having at least one stepped hole, a bolt extending through the at least one stepped hole of the securing member corresponding thereto and threadedly connected to the at least one tubular portion of the positioning member corresponding thereto.

2. The pair of eyeglasses as claimed in claim 1, wherein the chamber is a U-shaped chamber which forms an open end at the connector that is located corresponding to the lug, and a closed end which is formed at an inner end of the chamber, a width of the chamber is reduced from the closed end toward the open end, a width of the closed end is larger than a width of the open end, the width of the closed end is substantially equal to a width of the lug, the width of the open end is substantially equal to the width of the lug when the lens is installed to the frame.

3. The pair of eyeglasses as claimed in claim 1, wherein a band is connected between the two connectors.

4. The pair of eyeglasses as claimed in claim 1, wherein the two connectors each are connected to a temple.

5. The pair of eyeglasses as claimed in claim 1, wherein each of the two securing members is shaped to be the same as a shape of the concaved face corresponding thereto, each securing member has a protrusion which is formed at an inside thereof and shaped the same as a shape of the chamber corresponding thereto, the protrusion of each securing member is engaged with the chamber corresponding thereto, each of the two securing members is engaged with the concaved face of the connector corresponding thereto.

6. The pair of eyeglasses as claimed in claim 1, wherein two decorative members each are connected to an inside of each of the securing members, each of the two decorative members has at least one passage which is located corresponding to the at least one stepped hole of the securing member, the bolt extends through the at least one passage and the stepped hole and is threadedly connected to the at least one tubular portion of the positioning member corresponding thereto, each of the two decorative members includes two notches, each of the two securing members includes two positioning pins which are engaged with the notches to position the decorative member to the securing member corresponding thereto.

\* \* \* \* \*